(12) United States Patent
Harris et al.

(10) Patent No.: US 8,100,550 B2
(45) Date of Patent: Jan. 24, 2012

(54) METHOD AND SYSTEM FOR CONTROLLING LIGHT FIXTURES

(75) Inventors: Robert Harris, Orlando, FL (US); Adrian Ehresman, Melbourne, FL (US); Stephen Faber, Orlando, FL (US); Paul Koren, Altamonte Springs, FL (US); Roy Archer, Orlando, FL (US)

(73) Assignee: Next Step Products LLC, Orlando, FL (US)

( * ) Notice: Subject to any disclaimer, the term of this patent is extended or adjusted under 35 U.S.C. 154(b) by 133 days.

(21) Appl. No.: 12/474,755

(22) Filed: May 29, 2009

(65) Prior Publication Data

US 2009/0237002 A1 Sep. 24, 2009

Related U.S. Application Data

(62) Division of application No. 11/555,530, filed on Nov. 1, 2006, now Pat. No. 7,553,039.

(60) Provisional application No. 60/732,686, filed on Nov. 1, 2005.

(51) Int. Cl.
*F21V 33/00* (2006.01)

(52) U.S. Cl. ............. 362/101; 362/86; 362/249.02; 362/249.05; 362/276; 362/294; 315/185 S

(58) Field of Classification Search ............. 362/86, 362/87, 101, 234, 249.02, 249.05, 276, 294, 362/811; 315/185 S, 316
See application file for complete search history.

(56) References Cited

U.S. PATENT DOCUMENTS

| | | | |
|---|---|---|---|
| 5,207,499 A | 5/1993 | Vajda et al. | |
| 5,785,418 A | 7/1998 | Hochstein | |
| 6,045,240 A | 4/2000 | Hochstein | |
| 6,340,868 B1 * | 1/2002 | Lys et al. | 315/185 S |
| 6,577,080 B2 | 6/2003 | Lys et al. | |
| 6,798,154 B1 | 9/2004 | Sullivan et al. | |
| 6,827,464 B2 * | 12/2004 | Koren et al. | 362/101 |
| 7,125,146 B2 | 10/2006 | Willis et al. | |
| 2004/0223320 A1 | 11/2004 | Archer et al. | |
| 2006/0187652 A1 | 8/2006 | Doyle | |
| 2006/0261359 A1 | 11/2006 | Huang | |

OTHER PUBLICATIONS

Pool and Spa Lighting, poolandspa.com (Aug. 4, 2001), http://web.archive.org/web/20010804234651/http://www.poolandspa.com/page816.htm, Chapter "Lighting".
"Light Ready Return Water Fitting for Above Ground Pools Owners Manual", Pentair Pool Products (Apr. 5, 2001), http://web.archive.org/web/20060311105116/http://www.pentairpool.com/misc/owners_manuals/lighting/lght_rdy_rtn_fitg.pdf, Figure 5.

* cited by examiner

*Primary Examiner* — Stephen F Husar
(74) *Attorney, Agent, or Firm* — Akerman Senterfitt

(57) ABSTRACT

A system and method for controlling a plurality of light fixtures to create light and music, including a processor having a memory. Software is loaded in the memory and is executable by the processor to operate a plurality of light fixtures and at least one music speaker. At least one DMX controller is operable by the software to control the color of at least one of the plurality of light fixtures, the at least one light fixture controllable by the DMX controller including an LED light engine. The system and method generates light and sound displays by operating the lights in synchronization with music played through the music speaker. The color of at least one of the plurality of light fixtures is altered in synchronization with the music by the DMX controller. Also disclosed is a light fixture suitable for use in the light and music displays.

17 Claims, 7 Drawing Sheets

METHOD AND SYSTEM FOR CONTROLLING LIGHT FIXTURES

CROSS-REFERENCE TO RELATED APPLICATIONS

This is a divisional application of co-pending U.S. patent application Ser. No. 11/555,530, filed Nov. 1, 2006 and issued Jun. 30, 2009 as U.S. Pat. No. 7,553,039, which claims priority to U.S. Provisional application No. 60/732,686 filed on Nov. 1, 2005, the disclosures of which are now hereby incorporated by reference in their entirety.

FIELD OF THE INVENTION

This invention is directed generally to methods and systems for controlling light fixtures, and more particularly to methods and systems for controlling multiple LED light fixtures to provide coordinated light and sound displays. Additionally, a light fixture is disclosed that is suitable for use in the control systems and methods.

BACKGROUND OF THE INVENTION

Coordinated light and sound displays using outdoor lighting are known in commercial applications. For example, hotels and shopping malls may have installed lighting in fountains or spotlighting distinctive features, which can change color along with music. Such lighting systems are very expensive and difficult to install and maintain, and are not suitable for use in a domestic setting, such as in the yard or garden of a home.

It is also known to use fiber-optic cables for underwater lighting, which can be used to provide changing lighting colors in a domestic swimming pool, but fiber-optic lighting is expensive and difficult to install, and is not suitable for the retrofitting of existing pools. Additionally, the fiber-optic light fixtures are not as bright as traditional incandescent light fixtures, and are therefore not well used in pool and other underwater lighting applications.

In contrast to traditional light sources, solid state lighting, such as light emitting diode ("LED") fixtures, are more efficient at generating visible light than many traditional light sources. However, single LED lights are typically not bright enough for illuminating objects or for use in pool and other underwater lighting. In order to use LEDs for illumination, a cluster of LED fixtures must be provided. Although LEDs do not generally radiate heat in the direction of the beam of light produced, implementation of LEDs for many traditional light source applications has been hindered by the amount of heat build-up within the electronic circuits of the LEDs. This heat build-up is particularly problematic as more LEDs are added to a cluster. Heat build-up reduces LED light output, shortens lifespan and can eventually cause the LEDs to fail. It has therefore been problematic to use LED lights to provide light and sound displays in an outdoor setting.

LED light engines have recently become available, which supply multiple LED lights in an array. The light engines make it possible to provide a high lumen light using LEDs, and it is desirable to use such light engines in swimming pool, spa and other underwater lighting. However, the management of heat generated by the light engines is critical to maintaining the performance of the LED array, and the use of such LED light engines in different applications has not so far been achieved.

It is desirable to provide both light fixtures, such as spotlights, flood lights and pool lights, using LED light engines, and also to provide methods and systems for controlling multiple LED light fixtures to provide coordinated light and sound displays.

SUMMARY OF THE INVENTION

The exemplary embodiments provide a light engine that can be used without a niche which is advantageous in assembly. The light fixture of the exemplary embodiment can also be used in retrofitting fiber optic systems due to the use of low voltage and the significant reduction in the size of the light engine.

In one aspect, the present invention provides a system and method for controlling a plurality of light fixtures. The system includes a processor having a memory, software loaded in the memory and executable by the processor to operate a plurality of light fixtures and at least one music speaker. At least one DMX controller can be included, the DMX controller being operable by the software to control the color of at least one of the plurality of light fixtures, the at least one light fixture controllable by the DMX controller including an LED light engine. The system and method generates light and sound displays by operating the lights in synchronization with music played through the music speaker. The color of at least one of the plurality of light fixtures is altered in synchronization with the music by the DMX controller. The invention can provide a submersible light fixture, including a pipe for installation in a wall of a body of water, the pipe having a niche therein; and an LED light engine mounted in the niche, in which the niche is designed to be in fluid communication with a body of water when the light fixture is submerged such that the water acts as a heat sink to the LED light engine. The submersible light fixture may be used in the light and sound displays generated by the control method and system.

In another aspect, an underwater light assembly for a wall surrounding water is provided. The assembly has a pipe with at least one return fitting and is positioned in the wall; and a body that has a lens at one end and encloses a LED light engine and a heat sink. The body is inserted into the return fitting in the pipe. The LED light engine is coupled to a power source via the pipe. The lens protrudes from the pipe and is in contact with the water along an outer surface of the lens only. The LED light engine is cooled by convection cooling.

In another aspect, a system for controlling at least one entertainment component is provided comprising: a processor having a memory; and at least one DMX controller in communication with the processor to control a color of the at least one entertainment component. The at least one entertainment component comprises at least one LED light engine and the at least one DMX controller controls the at least one entertainment component by pulse width modulation to generate a light display.

In another aspect, an entertainment system comprises: a processor having a memory; a plurality of entertainment components; at least one DMX controller operable by the processor to independently control a color of each of the plurality of entertainment components, wherein the plurality of entertainment components comprises at least one LED light engine; a music source having at least one music composition; and an audio controller operably connected to the music source. The processor operates the audio controller to synchronize the at least one LED light engine to the music composition. The at least one DMX controller controls the at least one LED light engine by pulse width modulation to generate a light display.

The body can be elongated. The LED light engine is connected to the heat sink with conductive epoxy. The LED light engine and the heat sink are in thermal communication at least through thermal grease. Various other thermal communication techniques, methods, structures and combinations thereof can be used between the light engine and the heat sink, including but not limited to, heat transfer tape, heat transfer film, and other mechanical heat conducting structures and materials. The system can further comprise: a user interface selected from the group consisting essentially of a touch screen, a keypad, a remote controller and any combinations thereof, wherein the user interface is in communication with the processor for inputting commands. The system may further comprise: an audio controller operably connected to a music source and the processor to synchronize the at least one LED light engine to a music composition of the music source. The entertainment component can be a plurality of components that are each independently controlled by the processor and DMX controller.

The processor may be in communication with a remote data system, and the memory can be provided with program instructions for operating the DMX controller from the remote data system. The remote data system can be accessed by the processor via the internet. The plurality of entertainment components may be chosen from a group consisting essentially of LED laminar components, waterfall components, bubbler components, landscape lights, flood lights, accent tubes, underwater LED fixture, fountain lights, fiber optics, well lights, stairway lighting, down lights and LED node lights. The memory of the processor can be provided with program instructions for operating the DMX controller from the remote data system, and the program instructions can be embodied in a medium that is removable from the processor.

These and other arrangements and advantages are described in relation to the accompanying drawings.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF INVENTION

The present invention provides light emitting diode (LED) fixtures, and provides methods and system for controlling LED light fixtures. The invention most particularly relates to the provision and control of landscaping lighting, for example using pool, spa and other water feature lights in combination with spotlights and floodlights illuminating landscape fixtures, trees and other plants and buildings. In one embodiment, the invention relates to the provision of LED lights within pipes for installation in swimming pools, spas and the like. It will be appreciated that the LED fixtures described are intended for use in any suitable underwater application such as swimming pools, spas, fountains, sinks, waterfalls or any other water feature, and is not limited in this regard.

Figure 1:
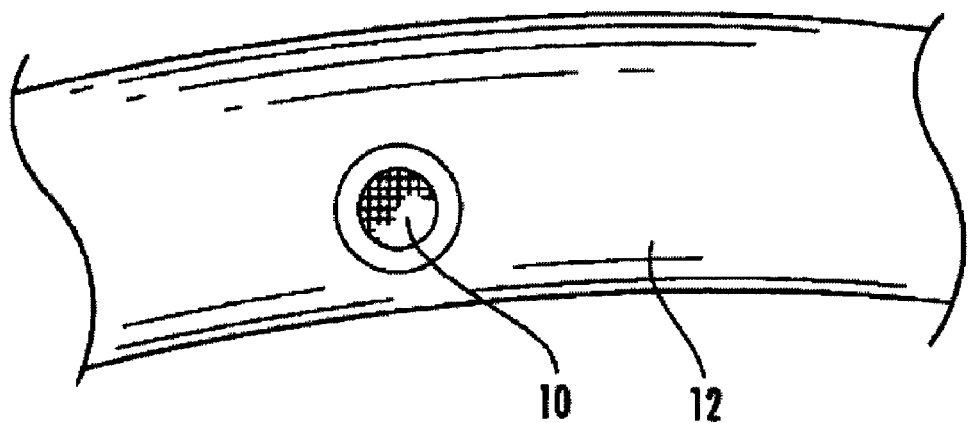
FIG. 1 is a front view of a light fixture according to the inventive arrangements.
Figure 2:
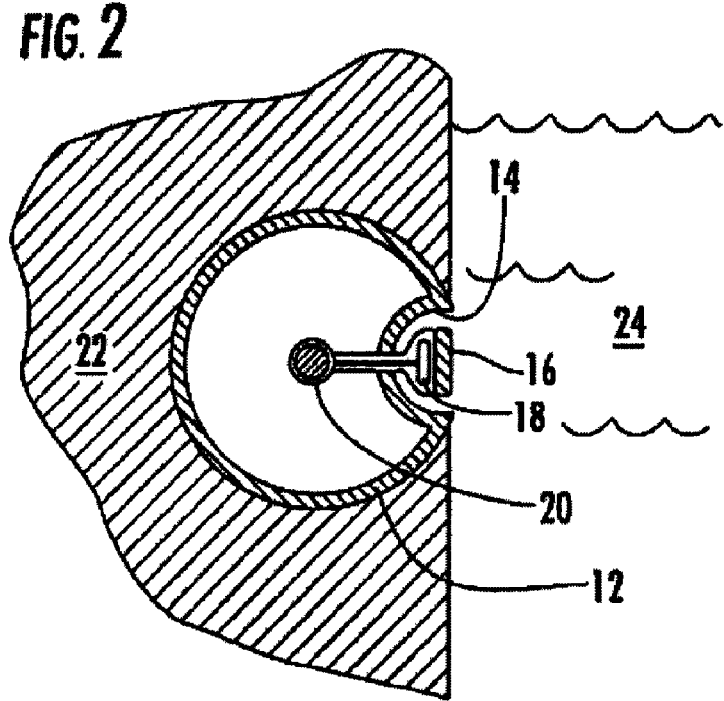
FIG. 2 is a cross-sectional view through the light of FIG. 1.

Referring to FIGS. 1 and 2, an LED light fixture 10 is shown, installed in a pipe 12. The pipe may be formed of any suitable material, and is preferably flexible. In a preferred arrangement, the pipe is formed of a PVC material. The pipe may have a diameter of less than 2 inches. The light does not need to be in a niche, as is necessary with conventional lights, because the pool water will cool the light without the need for any additional cooling. The light fixture 10 is slid into a niche 14 in the pipe, and is covered with a lens 16. The niche 14 is typically is an open-ended ball in the wall of the pool, such as a plastic ball. The light fixture includes an LED light engine 18, which is linked to a control console (not shown) by a wire 20. Only the lens 16 protrudes from the pipe in use. The niche allows water to circulate around the light fixture 10 and to cool the light. A plurality of the light fixtures 10 may be used in a single pipe 12, such that the lights are arranged around a wall 22 of a pool, spa or similar water feature containing water 24. The light fixtures 10 may be arranged in the side walls, and bottom of a pool, around the edge of the pool, in spas, in waterfall features, in landscape lighting, etc.

As used herein, a light engine is any optical system that can collect light from a lamp, such as light emitting diode, and deliver the light to a target, which can be used by the target or can be reformatted, such as improving spatial, angular and/or spectral uniformities of the light. Additionally, the light engines can feature one or more LED's, which can all be a single color or can be various colors.

Figure 3:
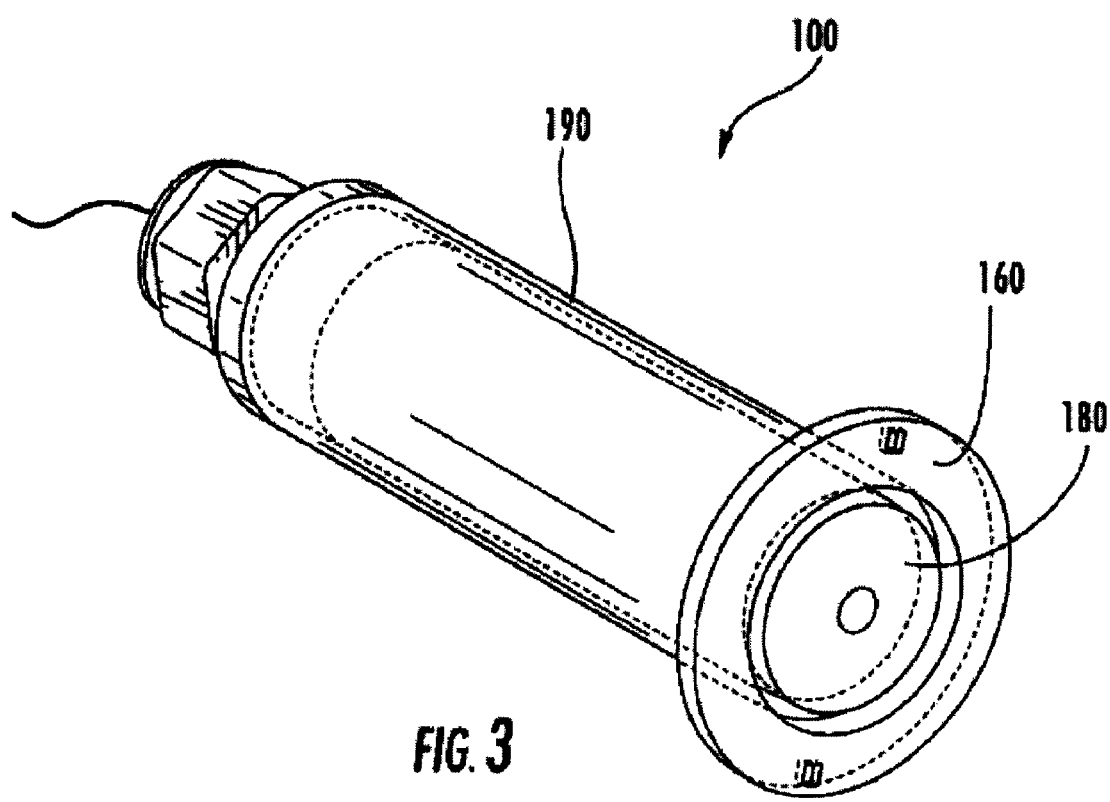
FIG. 3 is a perspective view of a light fixture according to a preferred embodiment of the inventive arrangements.
Figure 3A:
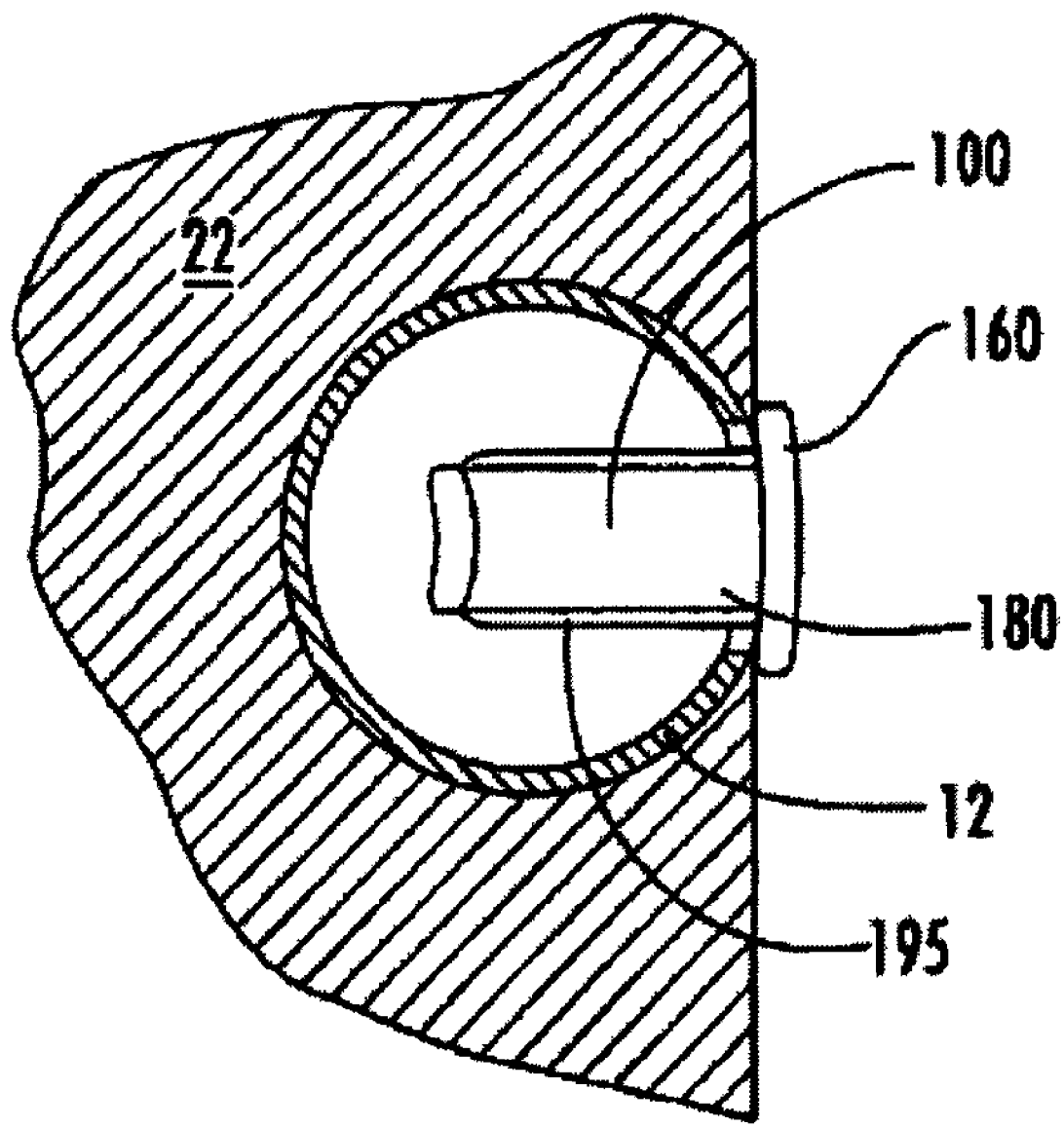
FIG. 3A is a cross-sectional view of the light fixture of FIG. 3 installed into a pipe.

In a preferred embodiment, as shown in FIGS. 3 and 3A, an LED light fixture 100 is shown, installed into a pipe 12 without the need for a niche (such as the niche 14 shown in FIG. 2). The pipe 12 may be formed of any suitable material, and is preferably flexible. In a preferred arrangement, the pipe 12 is formed of a PVC material that is positioned in a wall of the pool or spa and then plastered over so as to be flush or substantially flush with the pool wall. The pipe 12 may have a diameter of less than 2 inches. The light fixture 100 does not need to be in a niche, as is necessary with conventional lights, because the light is convection cooled. The light fixture 100 can have an elongated body that is inserted into a fitting 195 in the pipe 12, such as a 1½ inch return fitting. The light fixture 100 can include a lens 160.

The light fixture 100 includes an LED light engine 180, which is linked to a control console (not shown) by a wire (not shown). The lens 160 can protrude from the pipe 12 in use. A plurality of the light fixtures 100 may be used in a single pipe, such that the lights are arranged around a wall of a pool, spa or similar water feature containing water. The light fixtures 100 may be arranged in the side walls, and bottom of a pool, around the edge of the pool, in spas, in waterfall features, in landscape lighting, etc.

Figure 4:
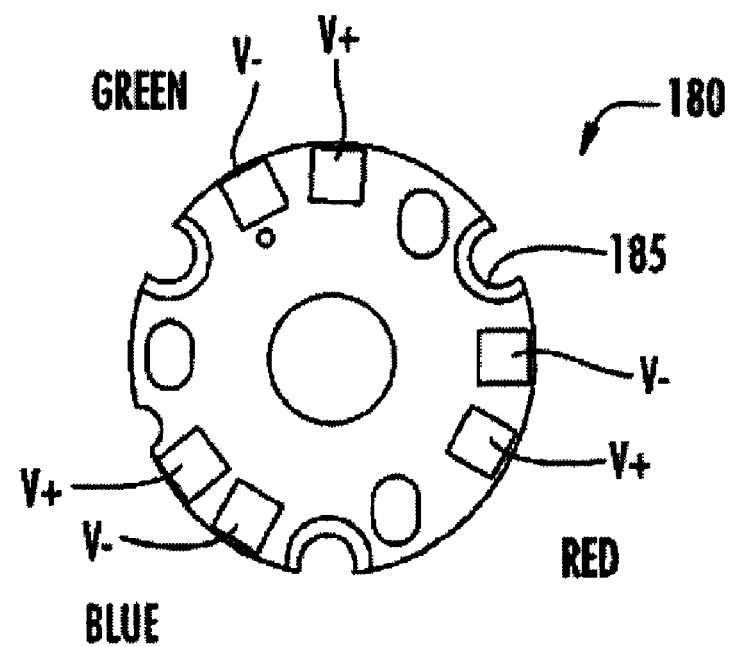
FIG. 4 is a plan view of a light engine usable with the light fixture of FIG. 3.
Figure 4A:
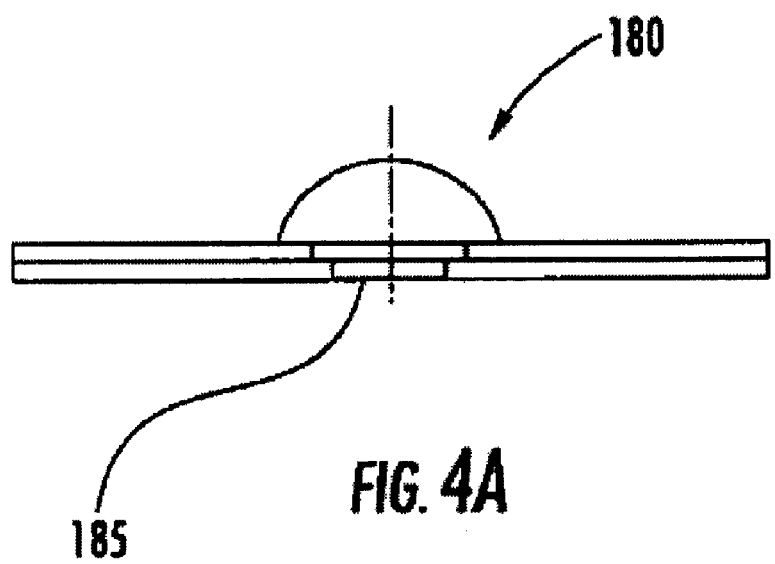
FIG. 4A is a side view of the light engine of FIG. 4.

The LED light fixture 100 may be an LED light engine, such as the BL-4000 RGB light engine available from Lamina Ceramics of Westhampton, N.J., as shown in FIGS. 4 and 4A. The BL-4000 LED array is configured with multiple LED's. In the RGB light engine, each cavity contains multiple red, green and blue LED dies for optimal color uniformity. The high brightness LED's are combined with a multilayer low temperature co-fired ceramic on metal (LTCC-M). The LTCC-M allows multiple LED's to be densely clustered to achieve high luminous intensity in a small array. The LED dies can be operated in any combination to emit a large number of colors, and the colors can be changed at will using a suitable control system. It will of course be appreciated that any number of LED's can be used, and that any suitable LED array or light engine may be employed in the present invention.

The light engine 180 can be a LED light engine delivering any number of lumens of warm white light, blended RGB and white at any temperature, such as, for example, 95 lumens of warm white light, 120 lumens of blended RGB and 120 lumens in white (5500°K) from a single point. The light engine 180 has a round footprint, standardized drive currents for ease of retrofitting and assembly, three channel control with independent input/output, an isolated metal base and a heat sink 190. It will of course be appreciated that any number of LED's can be used, and that any suitable LED array or light engine may be employed in the present invention. The light engine 180 can be attached to the heat sink 190 with conductive epoxy or other connecting techniques such as a screw connection with thermal grease applied thereto or other connection structures, materials and techniques. Mounting holes 185 and the like can be provided on the light engine 180 to facilitate assembly with the light feature 100.

Figure 5:
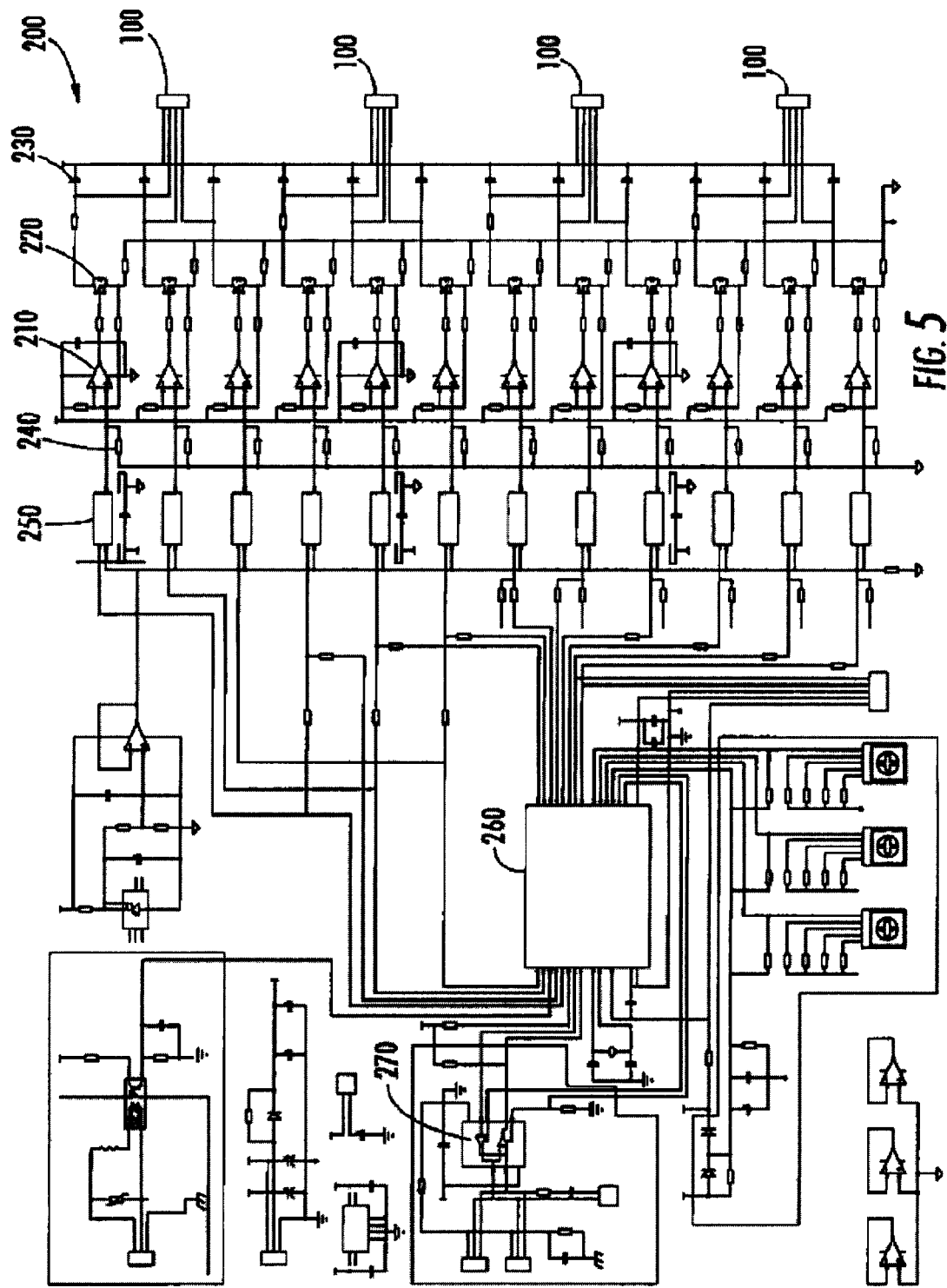
FIG. 5 is a power and control circuit for use with the light fixture of FIG. 3.

Light fixture 100 can utilize a low voltage power source, for example 12 to 15 volts, and can be retro-fitted into existing fiber optic pool and spa installations. The light fixture 100 has no minimum depth requirements and there are no moving parts associated therewith. The present disclosure contemplates various circuit components and configurations being utilized to control and provide power to the light fixture 100. For example, FIG. 5 shows a circuit 200 connected to the light fixtures 100. The circuit 200 uses a configuration of electrical components such as op-amps 210, transistors 220 (e.g., power MOSFETS), capacitors 230, resistors 240, switches 250 (e.g., quad bilateral switches), microcontrollers 260 (e.g., LCD microcontrollers) and transceivers 270 to drive and control the light engine 180 of each of the light fixtures 100. However, the present disclosure contemplates the use of other circuit components and other configurations of components for driving and controlling one or more of the light fixtures 100 described above.

Figure 3B:
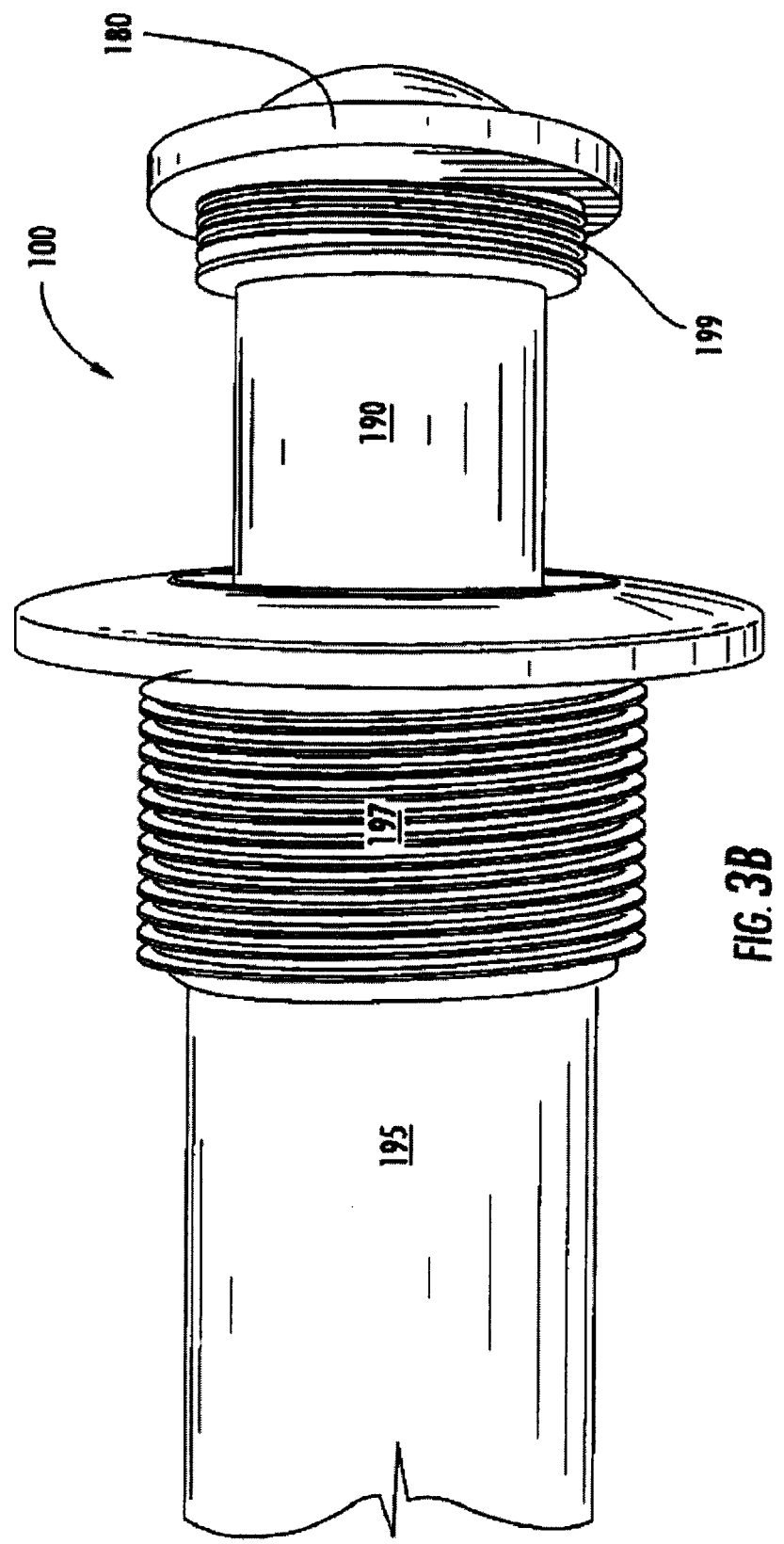
FIG. 3B is an exploded view of the light fixture of another exemplary embodiment of a light fixture of the inventive arrangements.

Referring to FIG. 3B, another embodiment of light fixture 100 is shown with a housing 195 having threads 197 to facilitate connection with the pipe. A key or the like can be used with the light engine 180 to facilitate connection with the housing 195 and the housing and light engine can be connected via the threads 199.

Figure 6:
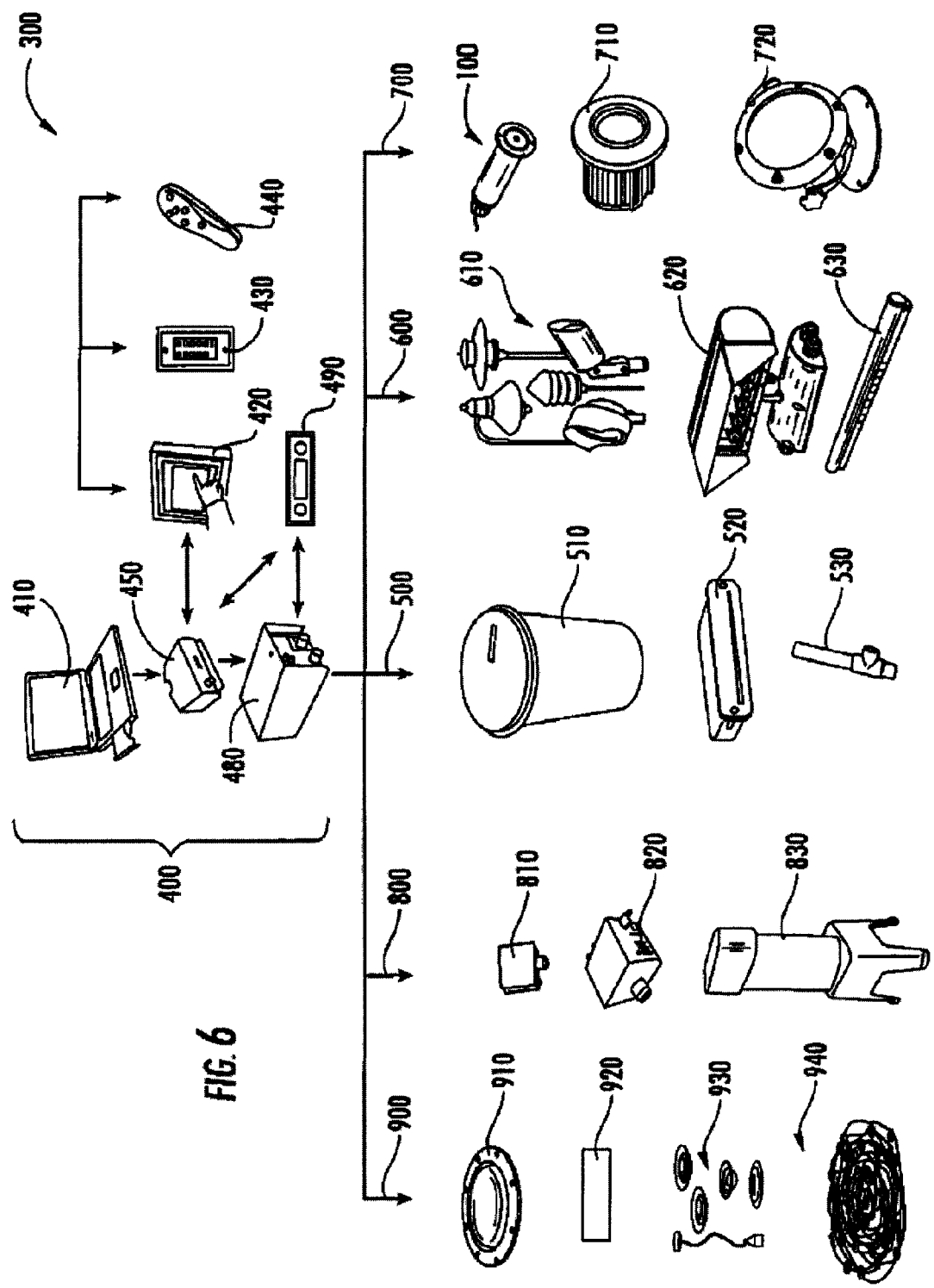
FIG. 6 is a schematic representation of an entertainment system of the present invention.

In another aspect of the invention, an entertainment system 300 is provided having a control system 400 for controlling multiple LED light fixtures to provide coordinated light and sound displays as shown in FIG. 6. The LED light fixtures that are used with the control system may include multiple LED light fixtures 10 and/or 100 as discussed, but may also include other pool and spa lighting such as underwater spotlights or other pool illumination lights, and above-ground lights such as spotlights and floodlights. Any type of light fixture may be connected to the control system 400, although it is preferred that LED light engines, e.g., light engines 180 are used because of the flexibility offered by the light engines for changing the color of the light emitted.

Various entertainment components can be used with system 300, including LED water features 500, such as, LED laminar components 510, waterfall components 520 and bubbler components 530; LED above-ground light fixtures 600, such as, landscape lights 610, flood lights 620 and accent tubes 630; underwater LED fixtures 700, such as light fixtures 100, lights 710 and fountain lights 720; LED light sources for fiber optics 800, such as, source 810, source 820 and tower illuminator 830; and other LED fixtures 900, such as well lights 910, stairway lighting 920, down lights 930 and LED node lights 940. These components can be used in various configurations to provide an aesthetically pleasing display. Other components can be used with entertainment system 300 such as those described in co-pending and commonly owned U.S. patent application Ser. No. 11/066,501 filed Feb. 25, 2005, U.S. patent application Ser. No. 11/265,691 filed Nov. 1, 2005 and U.S. patent application Ser. No. 11/265,692 filed Nov. 1, 2005, the disclosures of which are herein incorporated by reference.

The entertainment components used in system 300 may be in communication with control system 400 operating in compliance with the DMX512, DMX512/1990 or DMX512-A protocols, or any extensions thereof. These protocols can specify the transmission voltages, the data rate, the format of the data content, the type of cable and the type of connector to be used. The DMX protocols additionally can be used to specify the color of the light output by the light engine, which may change over time or in a programmed sequence to give a pleasing effect from the light fixture 10 and/or 100, as well as the other entertainment components. It will of course be appreciated that the invention is not limited to the use of DMX protocols, and that any suitable control module protocol may be used.

In a preferred arrangement, the control system 400 has a processor, microprocessor or computer 410 in communication with a DMX controller 450 and an audio controller 480 (e.g., a Symphony Of Light™ controller). The DMX controller 450 can receive inputs or commands from one or more of a touch screen interface 420, a keypad 430 and/or a remote control 440. The audio controller 480 can be connected to a music source such as a radio 490 for synchronization of music with the other entertainment components, e.g., light fixtures 100. Individual music compositions can be input to the control system 400 for synchronization with the light effects controlled by the DMX controller 450.

DMX controller 450 and computer 410 preferably control the entertainment components such as light fixtures 100 through use of pulse width modulation. The use of pulse width modulation power control by system 400 reduces the total amount of power delivered to the loads, e.g., each of the light fixtures 100, without losses normally incurred when a power source is limited by resistive means. Thus, control system 400 provides power efficiency, which is especially significant where a large number of entertainment components are being utilized in the system 300. However, other power control methods and techniques are contemplates by the present disclosure, including resistive power control. DMX controller 450 can preferably control each of the entertainment components independently. Rotary switches on the DMX controller 450 can be used to set the address of the particular entertainment component to facilitate use.

System 300 allows one or more lights and one or more music sources to be connected to the control system 400. A plurality of DMX control consoles may be connected, one for each light fixture or a single DMX control console 450 may be used to control multiple light fixtures. However, the present disclosure contemplates use of entertainment system 300 with other types of control techniques and components. For example, entertainment system 300 can use a stand along unit of control that allows for toggling of the power to cycle through various modes of operation, e.g., slow color change, selected colors, fade, fast color change and quick blinking lights.

Upon installation of the lighting system in a user's yard or garden (or in any other desired installation location), they may be set up with an initial control program, or a selection of programs. For example, there may be different lighting programs with appropriate music for Christmas (such as using red and green lighting), July 4$^{th}$ (using red, white and blue lighting), Halloween (using purple and orange lighting), Valentine's day (red, pink and white lighting), and a general lighting program selected by the user, among others. In a typical installation, the user may be given the choice to select 5 programs out of a standard 20 programs. Although various numbers of programs are contemplated by the present invention. The user may also request that a custom program be created to generate lighting and music displays of their own choosing.

Software or other program instructions can be used to control the lighting system and may be provided on the computer 410 upon installation of the system 300, or the user may use control software via the internet. A removable medium, such as a compact disk, may store the program instructions for the control system 400. A suitable website may be provided, which may periodically offer new lighting and music themes for downloading. The website may guide user's through the process of creating a custom light and sound display for entertainment system 300. For example, the user may select a musical composition, and then the software may ask the user to select desired colors of lighting, and times during the music when the user wishes the lighting to change color, brightness or to flash or provide other effects. Computer 410 is described herein by way of example as a central processing unit. Of course, it is contemplated by the present disclosure for computer 410 to include any programmable circuit, such as, but not limited to, computers, processors, microcontrollers, microcomputers, programmable logic controllers, application specific integrated circuits, and other programmable circuits.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A system for controlling at least one entertainment component, the system comprising:
   a processor having a memory; and
   at least one DMX controller in communication with the processor to control a color of the at least one entertainment component and configured to control the at least one entertainment component by pulse width modulation to generate a light display,
   wherein the at least one entertainment component comprises an underwater light assembly comprising:
      at least one LED light engine
      a pipe with at least one return filling; and
      a body having a lens at one end and enclosing the at least one LED light engine and a heat sink, the body being inserted into the return fitting in the pipe, the at least one LED light engine being coupled to a power source via the pipe, and the lens protruding from the pipe and being in contact with the water along an outer surface of the lens only.

2. The system of claim 1, further comprising:
   a user interface selected from the group consisting essentially of a touch screen, a keypad, a remote controller and any combinations thereof, wherein the user interface is in communication with the processor for inputting commands for control of the light display.

3. The system of claim 1, further comprising:
   an audio controller operably connected to a music source and the processor to synchronize the at least one LED light engine to a music composition of the music source.

4. The system of claim 3, wherein the at least one entertainment component comprises a plurality of entertainment components that are each independently controlled by the processor and DMX controller.

5. The system of claim 4, wherein the processor is in communication with a remote data system, and wherein the memory is provided with program instructions from the remote data system for operating the DMX controller.

6. The system of claim 5, wherein the remote data system is accessed by the processor via the Internet.

7. The system of claim 1, wherein the at least one LED light engine is cooled by convection cooling.

8. An entertainment system comprising:
   a processor having a memory;
   a plurality of entertainment components comprising an underwater light assembly, the underwater light assembly comprising:
      at least one LED light engine;
      a pipe with at least one return filling; and
      a body having a lens at one end and enclosing the at least one LED light engine and a heat sink, the body being inserted into the return fitting in the pipe, the at least one LED light engine being coupled to a power source via the pipe, and the lens protruding from the pipe and being in contact with the water along an outer surface of the lens only;
   at least one DMX controller operable by the processor to independently control a color of each of the plurality of entertainment components,
   a music source having at least one music composition; and
   an audio controller operably connected to the music source,
   wherein the processor operates the audio controller to synchronize the at least one LED light engine to the at least one music composition, and the at least one DMX controller controls the at least one LED light engine by pulse width modulation to generate a light display.

9. The system of claim 8, further comprising:
   a user interface selected from the group consisting essentially of a touch screen, a keypad, a remote controller and any combinations thereof, wherein the user interface is operably connected to the processor for inputting commands to control the light display.

10. The system of claim 8, wherein the plurality of entertainment components are chosen from a group consisting essentially of LED laminar components, waterfall components, bubbler components, landscape lights, flood lights, accent tubes, underwater LED fixture, fountain lights, fiber optics, well lights, stairway lighting, down lights and LED node lights.

11. The system of claim 8, wherein the processor is in communication with a remote data system, and wherein the memory is provided with program instructions from the remote data system for operating the DMX controller.

12. The system of claim 11, wherein the remote data system is accessed by the processor via the internet.

13. The system of claim 8, wherein the body of the underwater light assembly is elongated.

14. The system of claim 8, wherein the at least one LED light engine of the underwater light assembly is connected to the heat sink with conductive epoxy.

15. The system of claim 8, wherein the at least one LED light engine of the underwater light assembly and the heat sink of the underwater light assembly are in thermal communication at least through thermal grease, heat transfer tape, heat transfer film or a mechanical heat transfer structure.

16. The system of claim 8, wherein the memory of the processor is provided with program instructions for operating the DMX controller, and wherein the program instructions are embodied in a medium that is removable from the processor.

17. The system of claim 8, wherein the at least one LED light engine is cooled by convection cooling.

* * * * *